Aug. 11, 1953    A. O. CARPENTER ET AL    2,648,314
VALVE ACTUATOR
Filed June 20, 1950      2 Sheets-Sheet 1
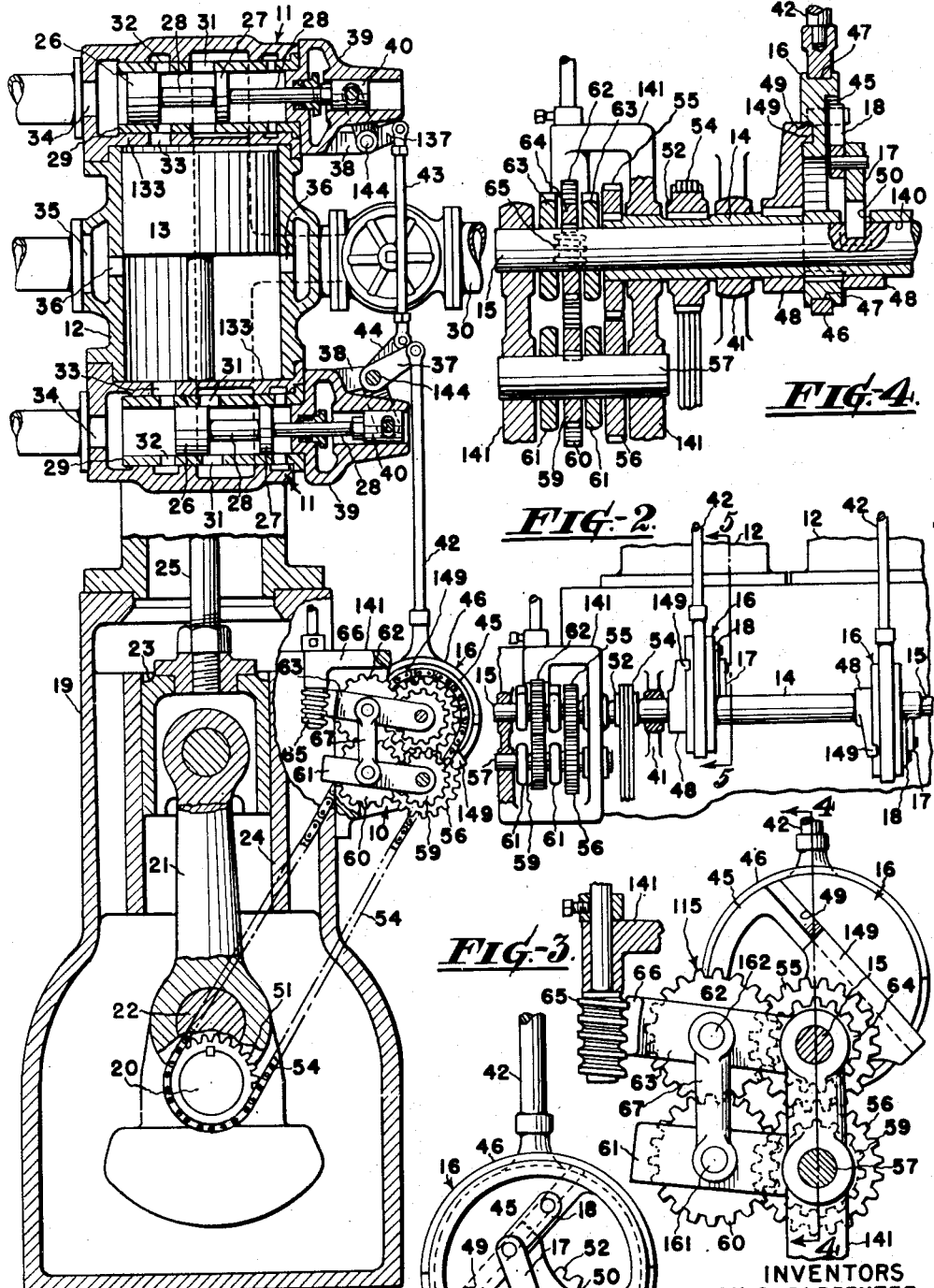
INVENTORS
ALLAN O. CARPENTER
CHARLES E. BLANK
THEIR ATTORNEY.

Aug. 11, 1953  A. O. CARPENTER ET AL  2,648,314
VALVE ACTUATOR
Filed June 20, 1950  2 Sheets-Sheet 2

INVENTORS
ALLAN O. CARPENTER
CHARLES E. BLANK
BY
THEIR ATTORNEY.

Patented Aug. 11, 1953

2,648,314

UNITED STATES PATENT OFFICE 2,648,314

VALVE ACTUATOR

Allan O. Carpenter, Corning, and Charles E. Blank, Painted Post, N. Y., assignors to Ingersoll-Rand Company, New York, N. Y., a corporation of New Jersey Application June 20, 1950, Serial No. 169,108

8 Claims. (Cl. 121—171)

1

This invention relates to valve actuators, and more particularly to a valve gear mechanism for actuating the valves of steam engines and the like.

One object of this invention is to vary the valve timing for a steam engine by varying the center of rotation of the eccentric used to actuate said valves.

Another object is to shift the eccentric in a straight line across the shaft in order to vary the center of rotation of said eccentric.

Still another object is to drive two cam shafts normally at the same speed and vary the relative speed of said shafts to shift the center of rotation of an eccentric driven by one of said shafts, and A further object is to provide a relatively simple and effective means whereby the shifting of the eccentric center may be accomplished.

Other objects will become obvious in the following specification and accompanying drawings in which, Figure 1 is an end view, partly in section, of a reciprocating steam engine provided with a preferred form of the valve actuating mechanism.

Figure 8:
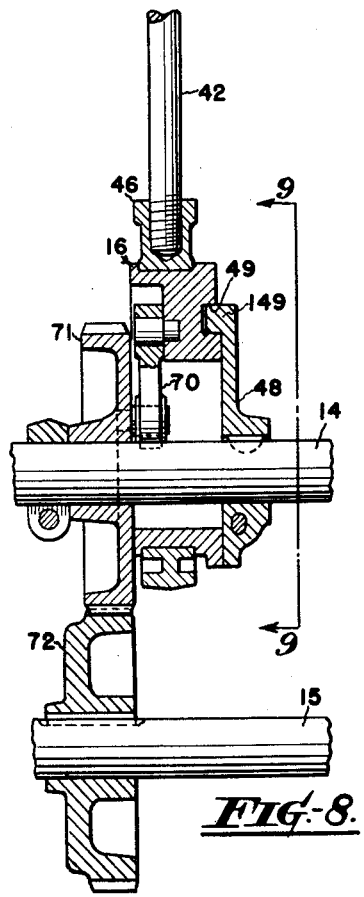
Figure 9:
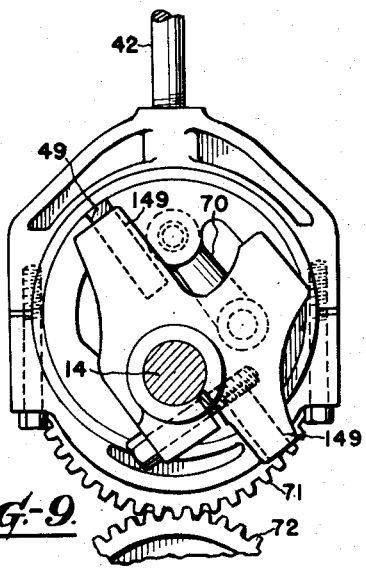
Figure 7:
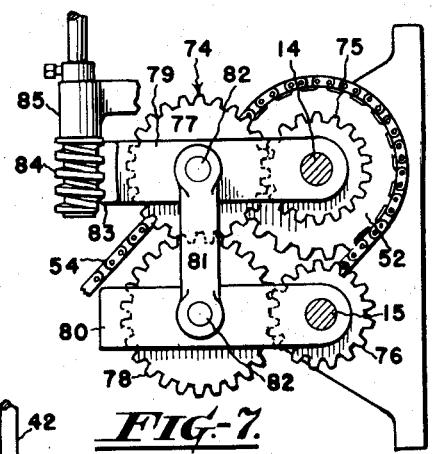
Figure 6:
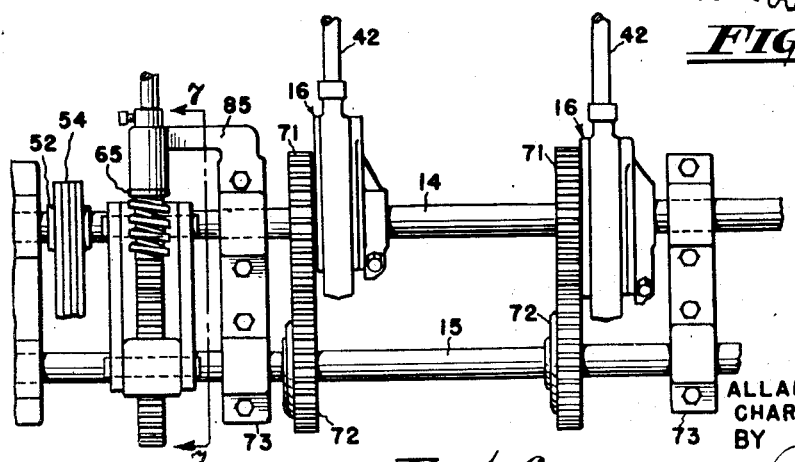

Fig. 2 is a longitudinal elevation, partly in section, of the valve actuating mechanism, Fig. 3 is an end view of the mechanism shown in Fig. 2, Fig. 4 is a transverse view taken through Fig. 3 along the lines 4—4 looking in the direction of the arrows, Fig. 5 is a transverse view taken through Fig. 2 along the lines 5—5 looking in the direction of the arrows, and shows the eccentric, Fig. 6 is a longitudinal view of a modified form of the valve actuating mechanism, Fig. 7 is a transverse view taken through Fig. 6 along the line 7—7 looking in the direction of the arrows, Fig. 8 is a sectional view of a detail of Fig. 6, and Fig. 9 is a transverse view taken through Fig. 8 along the line 9—9 looking in the direction of the arrows.

Referring to the drawings and more particularly to Figure 1, 10 designates in its entirety, a preferred form of the valve gear mechanism adapted to, for the sake of example, a multicylinder steam engine of the double acting uniflow type. The mechanism 10 serves to actuate valves 11 which control the flow of steam or other power fluid for driving pistons 13 in cylinders 12 of the engine, and to vary the timing relation of these valves with relation to the position of the pistons 13 in the cylinders 12.

2

To this end, the mechanism 10 comprises, in general, a pair of shafts 14 and 15, the eccentric shaft 14 being driven at the same speed, or R. P. M., as the crank shaft 20 of the steam engine through a chain driven gear arrangement, or other suitable means. The shaft 14 then, in turn, drives an eccentric 16 for actuating the valves 11 in a manner to be described in detail hereinafter. The eccentric control shaft 15 is also rotated at the same speed as the eccentric shaft 14 through a gear arrangement 115 pivotally mounted on the shafts 14 and 15. With this particular gear arrangement, slight movement thereof around its pivot point, or the shaft 15, results in amplified rotary movement of the control shaft 15, relative to the eccentric shaft 14; and this latter relative movement is utilized through suitable shifting connection—a shifter arm 17 and a link 18—to shift the eccentric 16 in a straight line fashion across the shaft 14 to vary the center of rotation of the eccentric 16. This change in eccentric throw varies the timing of the steam events in the usual manner.

As was previously mentioned, the steam engine to which the valve gear mechanism 10 is adapted is of a conventional type and, accordingly, includes a casing or frame 19 in which is journaled a crank shaft 20 driven by a connected rod 21 connected between a crank 22 and a crosshead 23 slidable in a guide 24. The crosshead 23, in turn, is connected in the usual manner by a piston rod 25 to the piston 13 in the cylinder 12 mounted on the casing 19.

Mounted at the opposite ends of the cylinder 12 are the valves 11 which may be of any conventional form and are shown by way of example as being of the balanced piston type slidably mounted in sleeves 29. Each valve 11 includes a pair of pistons, or plungers, 26 and 27 longitudinally spaced, relative to each other, on a valve stem 28. The piston 26 serves to control communication between the inlet ports 31 in the sleeve 29 and the admission ports 32 also in the sleeve 29 but longitudinally displaced from the ports 31. This control of communication controls the flow of steam into the cylinder 12 in that the ports 31 are in constant communication with a steam supply conduit 30, and the ports 32 are exposed to the interior of cylinder 12 through openings 33 in the walls 133 enclosing the ends of the cylinder 12.

With this arrangement, longitudinal movement of the valves 11 in one direction serves to communicate the inlet ports 31 with the admission ports 32 and thereby supply steam to the cylinder 12 for actuating the piston 13; and movement of the valves 11 in the opposite direction cuts off such supply of fluid to the cylinder and permits communication of the ports 32 with the exhaust passages 34 at the open ends of the sleeves 29. There is, of course, the usual exhaust passage 35 communicated with an intermediate portion of the cylinder through openings 36.

Longitudinal movement is imparted to the valves 11 by means of bell cranks 37 and 137 mounted at their angles on pins 144 pivotally mounted in support members 38 integral with guide pieces 39 mounted on the cylinder 12 and encircling plungers 40 on the free ends of the valve stems 28. To these plungers 40 the free end of one arm of the associated bell crank is pivotally connected, whereas the ends of the other arms of said bell cranks are connected through suitable links or rods to and are actuated by the eccentric 16. Specifically, the bell crank 37 serving to actuate the valve 11 at the crank end of the cylinder 12 is connected by a rod 42 to the eccentric 16; whereas the bell crank 137 for actuating the other, or head end, valve 11 is connected by a link rod 43 to a lever 44 rotated by the pin 144 which serves as an axis for and is rotated by the bell crank 37. Thus movement of the eccentric 16 directly actuates both valves 11, movement of the head end valve is, of course, approximately 180° out of time phase with that of the crank end valve 11.

Referring now to the gear arrangement for driving the eccentric, and more particularly to the form of the invention illustrated in Figures 1 through 5, the eccentric shaft 14 extends parallel to the longitudinal axis of the engine and adjacent the side thereof, hence the several eccentrics provided for actuating valves 11—one eccentric being provided for each of the cylinders 12 and in line therewith—may be mounted on a single shaft. The shaft 14 is journaled in bearing members 41 supported by webs spaced relative to each other along and integral with the casing 19, said members 41 being located preferably near an eccentric 16.

One end of the shaft 14, the left end as viewed in Fig. 2, is journaled in one side of a U, or box, shaped bracket 141 mounted on the side of the casing 19. The control shaft 15 which is arranged rotatably in a central bore 149 of the shaft 14 and coaxially therewith, extends throughout the entire length of the shaft 14 and across the U of the bracket and is journaled in the opposite side thereof. Located within the U of the bracket 141 is the gear arrangement 115 for driving the shafts 14 and 15 and also for causing the link 18 to shift the eccentric.

The eccentrics 16, mounted in spaced relation with respect to each other along the shaft 15, are shown in the form of perforated annular plates 45 loosely encircling the eccentric shaft 14. These plates are, of course, mounted abaxially with respect to the shaft 14 so that the rotation of the plates 45 with the shaft 14 results in an oscillatory motion which is transmitted to the associated rod 42 by means of a loop, or band, 46 slidable in a groove 47 in the periphery of a plate 45 and threadedly connected to the lower end of the rod 42.

Rotation of the plate 45 with the shaft 14 is obtained by means of a driving connection 48 encircling and keyed to the eccentric shaft 14 and having a radially extended fan shaped flange in face relation and abutting the side of the eccentric 16. A straight runner, or rib, 149 formed along the outer side of the flange 48 adjacent the free end thereof, rides in a groove 49 in the plate 45 thereby engaging the eccentric for rotation thereof. It is to be noted in this connection, that the groove 49 is arranged as a cord to the eccentric 16 and so arranged movement of the eccentric 16 with respect to the driving connection 48 shifts the center of the eccentric 16 along a straight line across the shaft 14. This means that as the eccentric is shifted along this line that the center of rotation of the eccentric will move nearer to or further away from the center of rotation of the shaft 14 thereby decreasing or increasing, as the case may be, the throw of the eccentric.

The shifting of the eccentric 16 is facilitated by means of a shifter connected between the control shaft 15 and the eccentric 16. In the embodiment as shown, this connection also prevents relative movement between the runner 149 and the eccentric 16 so that rotation of the connection binds the runner 149 in the groove 49 thereby rotating the eccentric about the shaft 14. In furtherance to this end, the shifting connection comprises a shifting arm 17 and link 18. One end of the arm 17 passes through a slot or hole 50 in the eccentric shaft and is keyed in the control shaft 15, the other end of the arm 17 is pivotally connected to the one end of the link 18, the opposite end of which is, in turn, pivotally connected to the eccentric 16 at a point in line with the groove 49 but on the opposite face, or side, of the eccentric therefrom.

Thus, it will be seen that any rotation of the control shaft 15 with respect to the shaft 14 will result in the movement of the eccentric 16 in a straight line fashion across the shaft 14 thereby varying the center of the eccentric 16 which, accordingly, varies its degree of oscillatory movement thereof. This means, of course, that the valve opening which is at a maximum when the eccentric is in one limiting position, is reduced and the cut-off made shorter as the eccentric moves from said limiting position toward the other limiting position. At the intermediate point where the center of the eccentric 16 is at its nearest point to the center of the shaft 14 there is no effective opening of the valves, and the engine stops. As the eccentric center is shifted toward the other extreme, or limit, the rotation of the engine is reversed.

The rotation of the control shaft 15 and the eccentric shaft 14 in unison and relative to each other is facilitated by the gear arrangement best seen in Figs. 3 and 4. Rotation of the shaft 14 at the same speed, or R. P. M., as the crankshaft 20 is accomplished by means of a pair of identical gears 51 and 52 which are keyed, respectively, to a crankshaft 20 and the shaft 14, rotation of the driving gear 51 being transmitted to the driven gear 52 by means of a chain 54 or other suitable drive.

Rotation of the shaft 14 is, in turn, transmitted to the eccentric control shaft 15 by means of a gear 55, keyed to the end of the shaft 14 which extends within the U of the bracket 141 for this purpose, and engaging an identical gear 56 keyed to a jackshaft 57 extending across the U of the bracket 141 parallel to the shaft 15 and journaled at its ends at the opposite sides of the bracket.

Rotation of the jackshaft 57 is then transmitted to the control shaft 15 through a gear train comprising identical gears 59 and 64 keyed to the jackshaft 57 and the shaft 15, respectively, and identical idler gears 60 and 62 of somewhat greater diameter than the gears 59 and 64 and engaged thereto for transmitting rotary motion therebetween. More particularly, the idler gear 60, which is driven by the gear 59, is supported between the parallel sides of a U shaped member 61 on a pin 161 extending therethrough; the free ends of the member 61 slidably encircle the jackshaft 57 on the opposite sides of the gear 59. The other idler gear 62, which is driven by the gear 60 and drives the gear 64, is mounted on a pin 162 extending between the parallel sides of a U shaped member 63 on a pin 162, the free ends of the member 63 encircle the shaft 15 on the opposite sides of the gear 64. A pair of links 67 are connected at their opposite ends to the pins 161 and 162 and are of such length as to maintain the gears 60 and 62 in engagement.

It is readily apparent with this arrangement that due to the relative size of the gears for rotating the shaft 15, the shaft 15 will rotate at the same speed, or R. P. M., as the shaft 14 and the crank shaft 20. Specifically, the gears 55 and 56 being identical, the jackshaft 57 will be driven at crank speed and in turn will drive the gear 59 keyed thereon at the same speed as the shaft 14. And, inasmuch as the gear 59 is identical with the gear 64, and identical idler gears 60 and 62 are used to transmit rotary movement between these gears (59, 64), they will rotate at the same speed thereby driving the shaft 15 at the same speed as the shaft 14. It is to be noted further that any relative rotary movement of the idler gear assembly supported by the member 63 about the shaft 15 will cause rotation of the shaft 15 in the same direction, and due to the difference in sizes between the gears 59 (or 64) and 62 (or 60), the shaft 15 will be rotated through a much greater angle than the angle through which the member 63 moves.

Rotation imparted to the shaft 15 by such movement of member 63 varies the angular relation between the shafts 14 and 15. This change in angular relation causes the eccentric 16 to be shifted in a straight line fashion across the shaft 14 in a manner hereinbefore described. Movement of the member 63 to shift the eccentric 16 is normally accomplished by means of a speed control device and in furtherance to this end, a worm gear 65 is mounted in a support integral with the bracket 141 and arranged to engage teeth 66 on the closed end of the member 63. The worm gear is rotated by a conventional speed control device (not shown).

Briefly, the operation of the afore-described valve actuator or gear mechanism adapted to the steam engine of type illustrated, is as follows:

Assuming that the shifting arm 17 is at one extreme end of its travel relative to the shaft 14—say, for example, the arm 17 is to the right as shown in Fig. 5, the valves 11 will be operated to admit steam alternately to the opposite ends of the cylinder 12 throughout a greater portion of the power stroke of the piston 13, i. e., maximum power of the engine will be available for counterclockwise rotation at the crank 20. As the arm 17 is shifted toward the intermediate point of its travel with respect to the shaft 14, the valves 11 are, accordingly, actuated to cut off the supply of steam at an earlier point in the power stroke of the piston 13 until effective steam admission ceases and the engine stops, at which time the arm 17 has reached said intermediate, or center, point of its travel. On passing through this point, due to the shifting of the center of the eccentric 16 from one side of the center of the shaft 15 to the other, the rotation of the crank 20 will reverse. It is to be noted that although the shifting of the center of the eccentric results in reverse rotation of the crank 20, the valve action is identical for either direction of rotation—it is the point of cut-off relative to the crank angle that is varied.

This variation in the valve opening or point of cut-off may be accomplished during the operation of the steam engine by rotation of the idler gear assembly supported by the member 63 about the shaft 15, which rotation is accomplished by means of a speed governor (not shown) or a manually operated device (not shown) for rotating the worm gear 65.

Assuming first that the shaft 14 is held stationary, and that the member 63 is rotated in a downward or counterclockwise direction about the shaft 15 as viewed in Fig. 3, the gear 60 will, due to such rotation, walk around the gear 59—the shaft 57 is locked against rotation by the gear 56 engaged by the gear 55 on shaft 14—and will, accordingly, rotate in a counterclockwise direction and drive the gear 62 in a clockwise direction. The gear 62, in turn, will drive the gear 64 in a counterclockwise direction thereby rotating the shaft 15 with respect to the shaft 14. And this relative rotation between the shafts 14 and 15 effects, through the shifter, movement of the eccentric 16 along the runner 149 thereby shifting the eccentric center relative to the center of rotation of the shaft 14.

Independently of the relative size of the gears 62 and 59 the angle through which the shaft 15 is rotated will always exceed twice the angle through which the arm 63 is rotated about the shaft 15. This difference in angular travel may be further increased by the proper choice of the gears 62 and 59 as is illustrated in the present embodiment of the valve actuator wherein the diameter of the gears 62 and 60 exceed the diameter of the gears 64 and 59. Mathematically, this angular relationship may be expressed as follows:

Rotation angle of shaft 15=2 travel angle of member 63

$$\left(\frac{\text{diameter gear 62}}{\text{diameter gear 59}}+1\right)$$

It is apparent from this relationship that rotation of the arm 63 through a small angle about the shaft 15 will result in a much greater angle of rotation of the shaft 15 relative to the shaft 14. This relative rotation of the shaft 15 with respect to the shaft 14 will, of course, vary the position of the center of the eccentric 16 in the manner hereinbefore described and although, for the sake of example, the shaft 14 was held stationary, the relative movement therebetween imparted by the rotation of the idler gear assembly about the shaft 14 is independent of the rotation of the shaft 14 in that whenever the shaft 14 is driven by the gear 51 the shaft 15, in turn, is driven at the same speed except as varied by movement of the member 63 as aforesaid.

Illustrated in Figures 6 through 9 is a modified form of the gear mechanism for varying the center of the eccentric with respect to the center of rotation of the shaft on which it is mounted. In principle, this form of the invention is similar to that of the previously described form of a mechanism—that is, there is provided a pair of shafts driven at the same speed as the crank speed of the engine, and a means for increasing or decreasing the speed of one of the shafts with respect to the other said shaft, and a shifting connection whereby this relative rotation is utilized to vary the center of rotation of the eccentric.

Referring in greater detail to the modified form of the invention, the eccentric shaft 14 is mounted in a manner and location with respect to the casing 19, similar to the arrangement previously discussed in connection with this shaft in the first said form of the invention. Too, the rotation of the shaft 14 is imparted in the manner previously discussed—namely, by means of the gears 51 and 52 connected by the chain 54. Another feature of this invention which is similar to the first form of the invention and which will not, therefore, be discussed in detail, is the form of the eccentric 16 and the manner in which it is driven by the driving connection 48.

In this form of the invention, however, movement, or shifting, of the eccentric 16 relative to the driving connection 48, is facilitated by means of a shifting connection comprising a single shifting arm 79 pivotally connected at one end to the eccentric 16 and at the other end at a point intermediate the circumference and the axis of a gear 71 rotatably mounted on the shaft 14. The gear 71 is driven normally at the same speed as the shaft 14 by a gear 72 keyed to the eccentric control shaft 15 and engaging the gear 71. The shaft 15, in this instance, extends parallel to the shaft 14 and is mounted therebelow in bearing members 73 secured to the casing 19.

Rotary motion is imparted to the shaft 15 by means of a gear train, designated in general by 74, which comprises a pair of identical driving gears 75 and 76 keyed to the shafts 14 and 15, respectively. A pair of identical idler gears 77 and 78 engage and serve to transmit the rotary motion between the gears 75 and 76.

Specifically, the gear 77 engaging the gear 75, is mounted between the parallel sides of a U-shaped member 79, the free ends of which rotatably encircle the shaft 14 on the opposite sides of the gear 75. The gear 78, engaging the gear 76 for driving the shaft 15, is mounted within a member 80, similar in shape to member 79, and the free ends thereof rotatably encircle the shaft 15 on the opposite sides of the gear 76.

Bars 81 are rotatably connected at their opposite ends to the ends of pins 82 extending through the members 79 and 80 and on which the gears 77 and 78 are mounted. The bars 81 are chosen of such length so as to maintain engagement of the gear 76 with the gear 77. Teeth 83 are provided on the closed end of the arm 79 which engage with a worm gear 84 supported on a bracket 85 and driven by a speed control device (not shown).

With this arrangement then, the eccentric shaft 14 is driven at the same speed as the crank shaft 20 through the gear arrangement 51 and 52 thereby driving the eccentric 16 through the driving connection 48 at the same speed. The shaft 15 is also driven at the same speed as the shaft 14 inasmuch as the gears 75 and 76 are identical in size and rotary motion is transmitted therebetween by idler gears 77 and 78 which are of equal diameter.

It will be noted, however, that the shaft 15 will be driven in a direction counter to that of the shaft 14. That is assuming that the gear 75 is being rotated in the counterclockwise direction (see Fig. 7), the gear 77 driven thereby will rotate in the clockwise direction, the gear 78 in the counterclockwise direction, and the gear 76 driven by the gear 78 will, of course, be driven in the clockwise direction, or in other words, in a direction counter to that of the shaft 14. Following through on this example, the gear 72 on the shaft 15 will be driven in the clockwise direction and accordingly the gear 71, on the shaft 14, with which it engages will be driven in the counterclockwise direction, or in the same direction of rotation as the shaft 14. The gears 71 and 72 being identical, the gear 71 will be driven at the same speed as the shaft 14 and the shifter arm 79 will hold the eccentric 16 in a fixed position relative to the driving connection 48.

Rotation of the shaft 15 relative to the shaft 14 is imparted by rotating the member 79 about the shaft 14 and this relative movement results in rotation of the gear 71 relative to the shaft 14 thereby shifting the eccentric 16, by means of the shifting arm 79, relative to the driving connection 48. Thus the eccentric is shifted in a straight line fashion across the shaft 14 and the center of the eccentric is varied relative to the center of the rotation of the shaft 14. More particularly, assuming the shaft 14 is held stationary, any movement of the arm 79 in the downward, or counterclockwise direction, as viewed in Fig. 7, causes the gear 77 to walk around the gear 75 thereby imparting clockwise rotation to the gear 78 which in turn rotates the gear 76 and the shaft 15 in the counterclockwise direction. This rotation of the shaft 15 relative to the shaft 14, causes the gear 71 to rotate about the shaft 14 in the clockwise direction to shift the eccentric in the manner previously described.

It is apparent from the construction and the previous discussion that rotation of the eccentric control shaft 15 relative to the eccentric shaft 14 may be imparted by angular movement of the member 79 irrespective of the rotary speed of the shaft 14.

It is apparent from the previous description that a valve actuator of gear mechanism construted in accordance with the practice of the invention accomplishes, among others, the objects hereinbefore stated and is capable of varying the valve timing of a steam engine or other device to which it may be adapted during the operation of said machine. And, further, that the exact setting of the eccentric with respect to its center of rotation is in no way limited throughout the entire range of the gear mechanism utilized for varying this setting or in other words, any valve setting or timing for the steam engine may be attained within the range of maximum power for rotation in one direction and maximum power for rotation in the opposite direction.

While we have shown and described specific forms of our invention, it is to be understood that various changes and modifications may be made without departing from the spirit of the invention as set forth in the appended claims.

We claim:

1. A valve actuating mechanism comprising, a pair of shafts rotating at the same speed, an eccentric encircling one of said shafts, a driving connection between the first said shaft and the eccentric and slidably engaged to the eccentric to permit transverse movement of the eccentric with respect to the first said shaft, a shifting connection between the eccentric and the other said shaft for causing such transverse movement of the eccentric whenever the relative rotational speed between the shafts is varied, and means connected between said shafts for varying the relative rotational speed between said shafts.

2. A valve actuator comprising a rotating shaft and a second shaft arranged parallel to the first said shaft, a gear train for transmitting rotary motion between said shafts, an eccentric driven by one of said shafts, means for varying the relative speed of said shafts, and a shifting connection between the other of said shafts and the eccentric for shifting the center of rotation of the eccentric whenever said shafts rotate at relatively different speeds.

3. A valve actuator comprising a rotating eccentric shaft, a control shaft arranged parallel to the eccentric shaft, a gear train for transmitting rotary motion from the eccentric shaft to the control shaft, said train including gears mounted on members rotatable about said shafts, an eccentric encircling the eccentric shaft and rotatable therewith, a shifting connection between the eccentric and the control shaft, and means for imparting movement to said members to vary the relative rotational speed of said shafts.

4. A valve actuator comprising a rotating eccentric shaft, a control shaft, a gear train connected between said shafts for driving the control shaft normally at the same speed as the eccentric shaft, means for varying the speed of rotation of some of the gears in said train for varying the relative speed of said shafts, an eccentric connected to and rotatable with one of said shafts, and a shifting connection between the eccentric and the other shaft for varying the center of rotation of the eccentric whenever said shafts rotate at different speeds relative to each other.

5. A valve actuating mechanism comprising, a pair of telescopically arranged members, an eccentric encircling said members, a driving connection between one of said members and the eccentric for rotating the eccentric and slidably engaging the eccentric, a shifting connection between the eccentric and the other said shaft, and means for imparting relative rotation between said shafts to actuate said connection to shift the eccentric.

6. A valve actuating mechanism for actuating the admission and exhaust valves of a steam engine, comprising a pair of telescopically arranged shafts, an eccentric encircling said shafts for actuating said valves, means for rotating the outer shaft at the same speed as the engine, a driving connection on the outer shaft slidably engaging the eccentric for rotating said eccentric, a shifting connection between the inner shaft and the eccentric for shifting the center of the eccentric in a straight line fashion across said shafts, a gear on the outer shaft, a gear on the inner shaft, a gear train rotatably supported with respect to said shafts for transmitting rotation of the first said gear to the second said gear to drive the second said gear at the same speed as the first said gear, and means for rotating said gear train about said shafts for imparting rotation to the inner shaft relative to the outer shaft.

7. A valve actuator comprising a rotating eccentric shaft, a control shaft, means for transmitting rotary motion from the eccentric shaft to the cónrol shaft for driving the control shaft normally at the same speed as the eccentric shaft, means operatively connected to the first said means for varying the relative speed of said shafts, an eccentric encircling the eccentric shaft, a driving connection between the eccentric and the eccentric shaft for rotating the eccentric therewith, a gear on the eccentric shaft and connected to the eccentric for positioning the eccentric relative to the eccentric shaft, and a gear fixedly mounted on the control shaft and engaging the first said gear for rotating it relative to the eccentric shaft whenever the relative speed of said shafts is varied.

8. A valve actuator comprising a rotating eccentric shaft, a control shaft, a gear train connected between said shafts for transmitting rotary motion of the eccentric shaft to the control shaft to rotate the control shaft normally at the same speed as the eccentric shaft, means for varying the speed of rotation of some of the gears in said train for varying the relative speed of said shafts, an eccentric encircling the eccentric shaft, a driving connection between the eccentric and the eccentric shaft for rotating the eccentric therewith, a gear on the eccentric shaft and connected to the eccentric for positioning the eccentric relative to the eccentric shaft, and a gear mounted on the control shaft and rotatable therewith and engaging the first said gear for rotating it relative to the eccentric shaft whenever the relative speed of said shafts is varied.

ALLAN O. CARPENTER.
CHARLES E. BLANK.

References Cited in the file of this patent

UNITED STATES PATENTS

| Number | Name | Date |
| --- | --- | --- |
| 267,534 | Hunter | Nov. 14, 1882 |
| 473,906 | Bullock | May 3, 1892 |
| 2,132,377 | Bird et al. | Oct. 11, 1938 |
| 2,310,209 | Bousman | Feb. 9, 1943 |
| 2,513,982 | Williams | July 4, 1950 |